US009296081B2

(12) United States Patent
Wang et al.

(10) Patent No.: US 9,296,081 B2
(45) Date of Patent: Mar. 29, 2016

(54) OPTICAL FIBER CONNECTOR POLISHING APPARATUS AND METHOD

(75) Inventors: Jianhua Wang, Shanghai (CN); Guanpeng Hu, Shanghai (CN); Ronald P. Pepin, Georgetown, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/394,170

(22) PCT Filed: Apr. 27, 2012

(86) PCT No.: PCT/CN2012/074816
§ 371 (c)(1),
(2), (4) Date: Oct. 13, 2014

(87) PCT Pub. No.: WO2013/159332
PCT Pub. Date: Oct. 31, 2013

(65) Prior Publication Data
US 2015/0079882 A1    Mar. 19, 2015

(51) Int. Cl.
*B24B 19/22*    (2006.01)
*G02B 6/38*    (2006.01)

(52) U.S. Cl.
CPC ............ *B24B 19/226* (2013.01); *G02B 6/3863* (2013.01)

(58) Field of Classification Search
CPC ...... B24B 19/226; B24B 37/08; B24B 53/12; B24B 9/065; B24D 15/08; B24D 15/105; G02B 6/3863
USPC .................................................. 451/55, 324
See application file for complete search history.

(56) References Cited

U.S. PATENT DOCUMENTS

| 772,431 | A | * | 10/1904 | Rameau | B24B 19/226 |
| | | | | | 451/271 |
| 3,975,865 | A | | 8/1976 | Lewis | |
| 4,178,722 | A | | 12/1979 | Forman | |
| 4,291,502 | A | | 9/1981 | Grimsby | |
| 4,839,993 | A | * | 6/1989 | Masuko | B24B 19/226 |
| | | | | | 451/283 |
| 4,979,334 | A | | 12/1990 | Takahashi | |
| 5,007,209 | A | | 4/1991 | Saito | |
| 5,018,316 | A | * | 5/1991 | Mulholland | B24B 19/226 |
| | | | | | 451/364 |
| 5,185,966 | A | | 2/1993 | Mock, Jr. | |
| 5,216,846 | A | | 6/1993 | Takahashi | |

(Continued)

FOREIGN PATENT DOCUMENTS

| CN | 2441604 | 8/2001 |
| GB | 2069381 | 8/1981 |

(Continued)

OTHER PUBLICATIONS

International Search Report for PCT International Application No. PCT/CN2012/074816 mailed on Jan. 24, 2013, 3 pages.

*Primary Examiner* — George Nguyen
(74) *Attorney, Agent, or Firm* — Janet Kling

(57) ABSTRACT

A polishing apparatus for polishing an optical fiber connector is disclosed. The polishing apparatus has a base portion to support a polishing media; and a polishing puck. The polishing puck includes a connector mount, to receive and hold the optical fiber connector secured to a terminal end of an optical fiber, and a polishing gear configured to engage with a ring gear disposed in the base portion such that a fiber tip of optical fiber mounted in the optical connector traces a roulette pattern on the polishing media upon rotational engagement of the polishing gear within the ring gear.

18 Claims, 12 Drawing Sheets

(56) References Cited

U.S. PATENT DOCUMENTS

| | | | |
|---|---|---|---|
| 5,349,784 A | 9/1994 | Grois | |
| 5,351,445 A | 10/1994 | Takahashi | |
| 5,408,558 A | 4/1995 | Fan | |
| 5,412,747 A * | 5/1995 | Matsuoka | B24B 19/226 385/139 |
| 5,813,081 A * | 9/1998 | Wang | B08B 1/00 15/210.1 |
| 6,039,630 A * | 3/2000 | Chandler | B24B 19/226 451/278 |
| 6,396,996 B1 * | 5/2002 | Carpenter | B24B 19/226 385/137 |
| 6,471,570 B1 | 10/2002 | Minami | |
| 6,790,131 B2 | 9/2004 | Wetenkamp | |
| 6,945,860 B2 | 9/2005 | Matsui | |
| 7,491,114 B2 | 2/2009 | Zhang | |
| 7,775,726 B2 | 8/2010 | Pepin | |
| 8,771,042 B2 | 7/2014 | Pepin | |
| 2003/0036342 A1 | 2/2003 | Yamada | |
| 2003/0182015 A1 * | 9/2003 | Domaille | B24B 19/226 700/164 |
| 2011/0275283 A1 | 11/2011 | Pepin | |
| 2011/0312249 A1 | 12/2011 | Bylander | |

FOREIGN PATENT DOCUMENTS

| | | |
|---|---|---|
| JP | 64-5764 | 1/1989 |
| WO | WO 2009-051918 | 4/2009 |
| WO | WO 2010-088184 | 8/2010 |
| WO | WO 2013-159331 | 10/2013 |

* cited by examiner

OPTICAL FIBER CONNECTOR POLISHING APPARATUS AND METHOD

BACKGROUND OF THE INVENTION

1. Field of the Invention

The present invention is directed to an apparatus and method for polishing an optical fiber, in particular, an optical fiber terminated and polished in the field.

2. Background

In the area of optical telecommunication networks, fiber optic connectors are one of the primary ways to connect two or more optical fibers. There are several classes of optical fiber connectors including adhesive ferruled connectors, in which the fiber tip is held in a substantially fixed position relative to the tip of the ferrule by adhesively securing the fiber within the bore of the ferrule. Another class of connectors includes non-ferrule connectors, which rely on the buckling of a length of fiber to create contact pressure. Another class of connectors includes remote grip (ferruled) connectors, where the fiber is secured at some distance away from the terminal end or tip of the fiber.

When installing a remote grip connector in the field, one current practice uses a coplanar/flush polish. In remote grip connectors, as with other connector types, low optical losses and minimal reflections are achieved when the terminal ends of at least two optical fibers make secure physical contact. However, any differences in the coefficient of expansion between the fiber and the ferrule assembly may result in a non-contacting fiber tip when the temperature is raised, or lowered. The resulting gap can lead to significant reflection. A conventional remote grip connector is described in U.S. Pat. Nos. 5,408,558 and 7,775,726.

Another current practice involves a technician performing a field polish to create a fiber terminal end which protrudes beyond the ferrule tip. This method of polishing remote grip connectors produces a range of protrusions that provide a secure physical contact while avoiding excess force on the fiber tips. This method, when carefully followed, allows sufficient physical contact of the at least two fiber terminal end faces at temperatures for indoor applications (0° C. to 60° C.). However, the conventionally polished field-terminated remote grip connector may not be recommended for outdoor use, which has more stringent temperature requirements (−40° C. to 80° C.). Factors leading to unacceptable optical loss may result from the intrinsic variability of the field polishing process, craftsman error, over polishing (e.g. using too much force or too many strokes and coarse, clogged or contaminated abrasive) or substitution of a different type of abrasive.

The following references describe conventional devices for polishing optical fibers: US 2011/0275283 A1; US 2011/0312249 A1; U.S. Pat. Nos. 3,975,865; 4,178,722; 4,291,502; 4,979,334; 5,007,209; 5,185,966; 5,216,846; 5,349,784; 5,351,445; 6,790,131; 6,945,860; and 7,491,114.

SUMMARY

According to an exemplary aspect of the present invention, a polishing apparatus is provided for polishing an optical fiber connector. The optical fiber connector includes a connector housing and a ferrule. The polishing apparatus has a base portion to support a polishing media; and a polishing puck. The polishing puck includes a connector mount, to receive and hold the optical fiber connector secured to a terminal end of an optical fiber, and a polishing gear configured to engage with a ring gear disposed in the base portion such that a fiber tip of optical fiber mounted in the optical connector traces a roulette pattern on the polishing media upon rotational engagement of the polishing gear within the ring gear.

According to another exemplary aspect of the present invention, the polishing apparatus includes a connector mount to receive and hold the optical fiber connector and a polishing apparatus housing having a base portion that supports a polishing media and that includes a ring gear. The ring gear includes a plurality of interior teeth disposed along the interior circumferential edge of the ring gear. The polishing apparatus further includes a polishing puck comprising the connector mount disposed within a polishing gear. The polishing gear has a plurality of exterior teeth protruding from the circumferential edge of the polishing gear. The exterior teeth on the polishing gear engage with the interior teeth of the ring gear of the polishing apparatus housing, such that the polishing media is disposed proximate to a fiber tip extending from an end face of the ferrule of the optical fiber connector disposed in the connector mount.

According to yet another exemplary aspect of the present invention, a method of polishing an optical fiber connector comprises providing an optical fiber having a stripped terminal end. The stripped terminal end of the optical fiber is cleaved to a desired length to produce a fiber tip. The stripped and cleaved optical fiber is inserted through the optical fiber connector and ferrule such that the fiber tip protrudes from an end face of the ferrule by a known amount. The optical fiber is then secured in the optical fiber connector.

The optical fiber connector is placed in a polishing apparatus. The polishing apparatus includes a polishing apparatus housing having a base portion that supports a polishing media and that includes a ring gear. The ring gear includes a plurality of interior teeth disposed along the interior circumferential edge of the ring gear. The polishing apparatus further includes a polishing puck comprising a connector mount disposed within a polishing gear. The polishing gear has a plurality of exterior teeth protruding from the circumferential edge of the polishing gear. The exterior teeth on the polishing gear engage with the interior teeth of the ring gear of the polishing apparatus housing, such that the polishing media is disposed proximate to the fiber tip extending from the end face of the ferrule of the optical fiber connector disposed in the connector mount.

The polishing puck is moved in a circular path within the ring gear such that the fiber tip extending from the end face of the optical fiber connector traces a roulette on the polishing media.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1A:
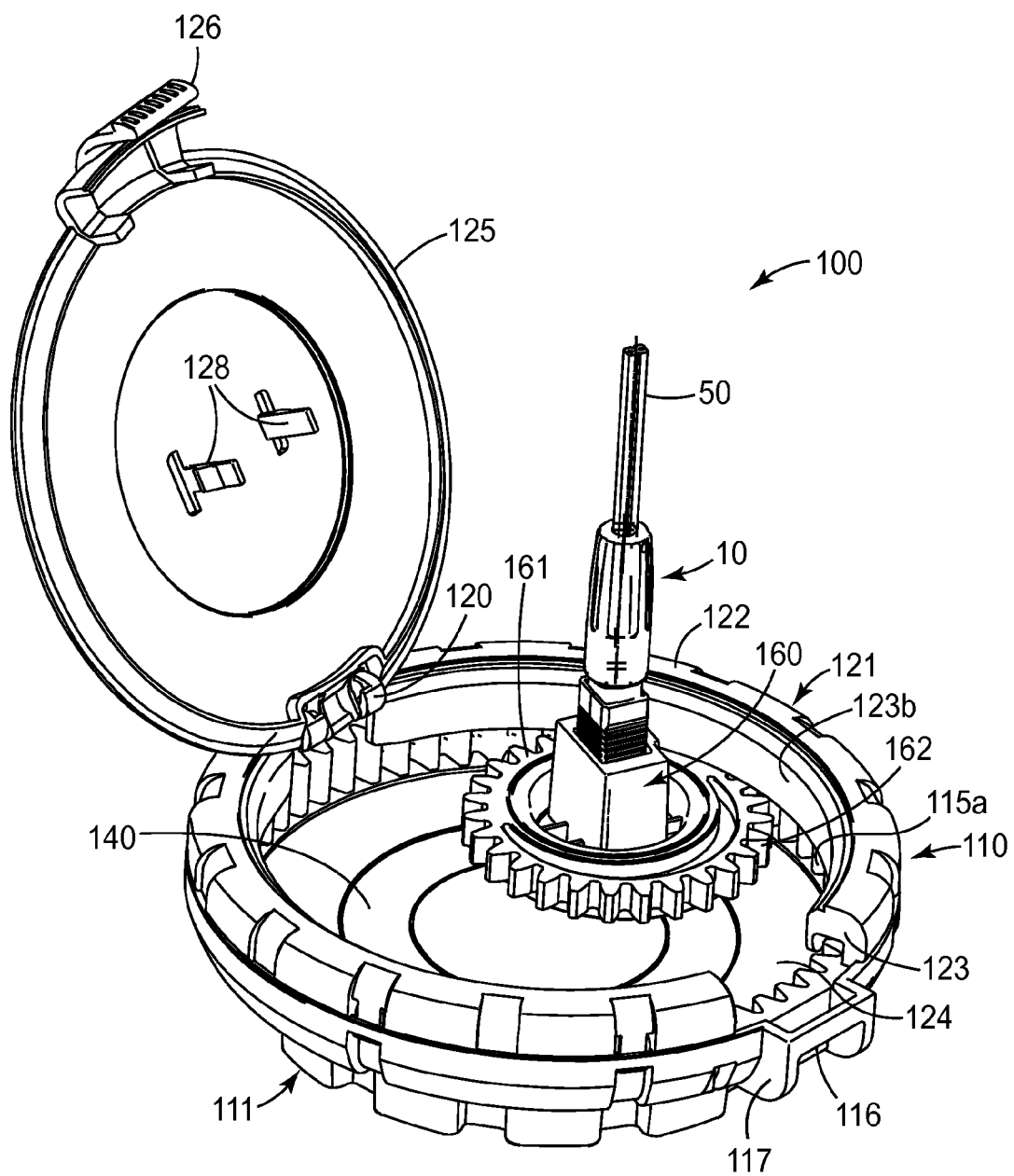
FIGS. 1A-1C are three views of an exemplary polishing apparatus according to an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to an apparatus and method for polishing an optical fiber terminated in an optical fiber connector. As described herein, a simple method of field polishing an optical fiber connector can provide consistent, repeatable results in a low cost polishing tool. In addition, simple method of field polishing described herein can substantially reduce the craft sensitivity, when contrasted with traditional field polishing methods, and can reduce connector installation costs. In a preferred aspect, the polishing apparatus can be a lightweight, hand-held, mechanical device that is operated manually in the field.

Figure 7:
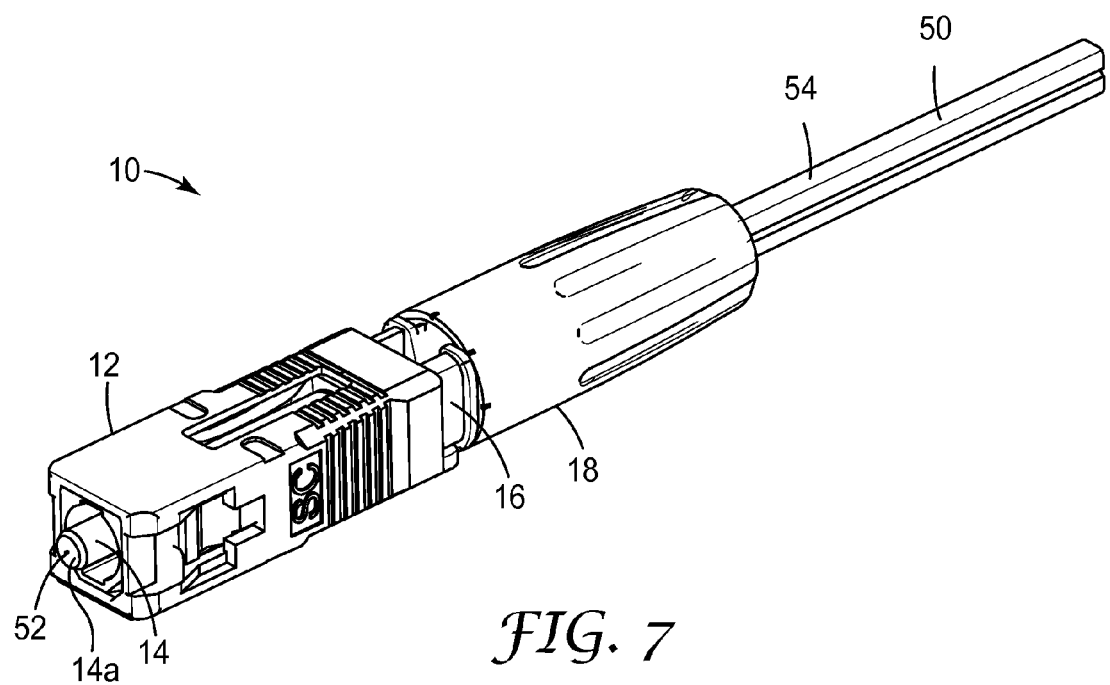
FIG. 7 is an isometric view of an exemplary optical fiber connector that can be polished with the polishing apparatus of the current invention.

Polishing apparatus 100 may be used to polish a variety of optical fiber connector styles, for example, a remote grip style optical fiber connector such as a Crimplok™+ Connector available from 3M Company (St. Paul, Minn.). FIG. 7 shows another type of a remote grip optical fiber connector 10, which is described in detail in a PCT Patent Application, having attorney docket no. 67944WO002, entitled "Optical Fiber Connector" and filed on the same day herewith, incorporated by reference herein in its entirety. Optical fiber connector 10 includes a ferrule 14 securely disposed in an opening in one end of the collar body (not shown). The collar body is retained within an outer housing 12 of the optical fiber connector 10. The collar body is configured to receive a mechanical gripping device to grip an optical fiber from an optical fiber cable 50 within the connector. A backbone 16 retains the collar body within outer housing 12 and includes a fiber jacket clamping portion (not shown) to clamp on a jacket 54 of the optical fiber cable 50. A boot 18 is attachable to a portion of the backbone, wherein the boot actuates the fiber jacket clamping portion of the backbone to secure the backbone onto the cable jacket 54 of optical fiber cable 50. The exemplary polishing apparatus 100 is configured to bring the end face 14a of connector ferrule 14 and protruding optical fiber tip 52 into proximity of the polishing media disposed in the polishing apparatus. The optical fiber connector can further include a end cap (not shown) disposed over the connector ferrule to prevent environmental contamination of the connector ferrule prior to mounting the optical fiber connector onto the optical fiber cable. In an exemplary aspect, the end cap can include a recess to enable only a predetermined length of the optical fiber (e.g. fiber tip 52) to extend from the end face 14a of the connector ferrule 14.

The optical fiber cable 50 can be a conventional cable such as a 250 μm or 900 μm buffer coated fiber, Kevlar® reinforced jacketed fiber, a jacketed drop cable or other sheathed and reinforced fiber. The optical fiber of the optical fiber cable can be single mode or multi-mode. Example multi-mode fibers can have a 50 μm core size, a 62.5 μm core size, or a different standard core size. In another alternative aspect, the optical fiber cable can comprise a conventional plastic optical fiber. In yet another aspect, the optical fiber cable 50 can be an FRP drop cable, a 1.6 to 3.0 mm jacketed drop cable, or other optical fiber drop cable.

Figure 4A:
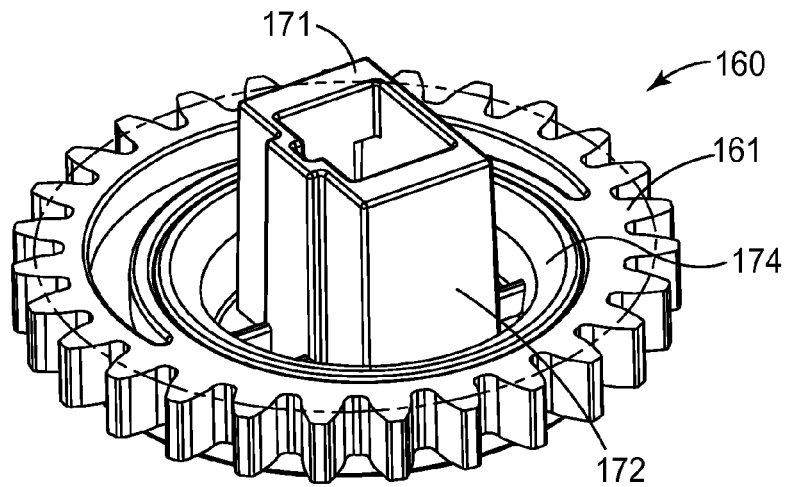
FIGS. 4A-4C are three views of a polishing puck used with the polishing apparatus of FIG. 1A.

The polishing apparatus is useful in applications where the final optical end finishing step is completed after the optical fiber has been secured within an optical fiber connector. Other exemplary optical fiber connector styles that can polished using the exemplary connector of the current disclosure include hot melt style connectors such as a 3M™ 8300 Hot Melt SC connector, or an epoxy connector such as a 3M™ 8206 FC/APC Connector (Epoxy), both of which are available from 3M Company (St. Paul, Minn.). In an exemplary aspect, optical fiber connector 10 can have an SC format as shown in FIG. 7. In other aspects, the polishing apparatus can be configured to receive a connector having another standard connector format, such as an LC format, FC format, ST format, etc. by simply changing out the connector mount 171 in the polishing puck 170 (FIG. 4A). In a further alternative, the connector mount 171 can be configured to receive multi-fiber optical connector, such as an MT fiber connector or a MPO optical fiber connector.

Figure 1B:
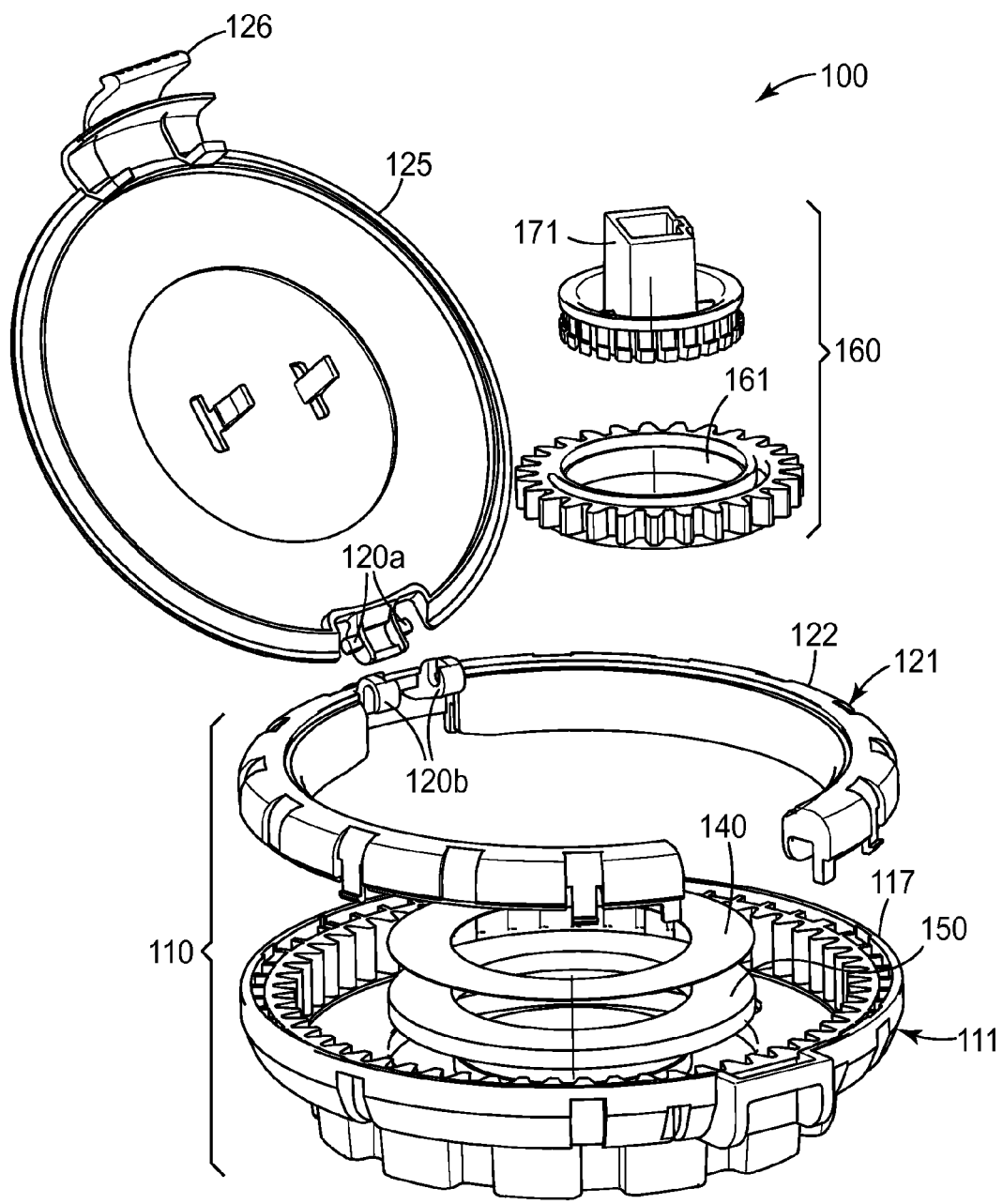

FIGS. 1A and 1B show an assembled open view and an exploded view of an exemplary embodiment of polishing apparatus 100. The polishing apparatus 100 includes a polishing apparatus housing 110 having a base portion 111 and an optional cover portion 121. The cover portion can have an attachment ring 122 to secure the cover portion to the base portion 111 and a lid 125. The lid can be opened, as shown in FIG. 1A, to provide access to the interior of the polishing apparatus housing when the cover portion is disposed on the base portion. Alternatively, lid 125 can be closed when the polishing apparatus is not in use. In an alternative aspect, a single snap-on cover portion may be fitted to the base portion when the polishing apparatus is not in use.

Figure 1C:
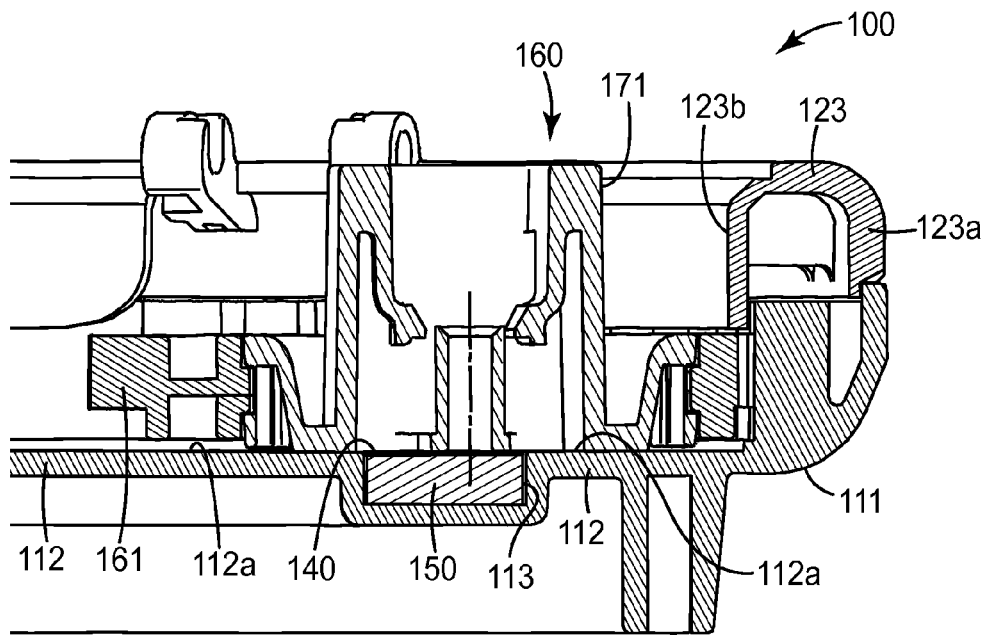
Figure 2:
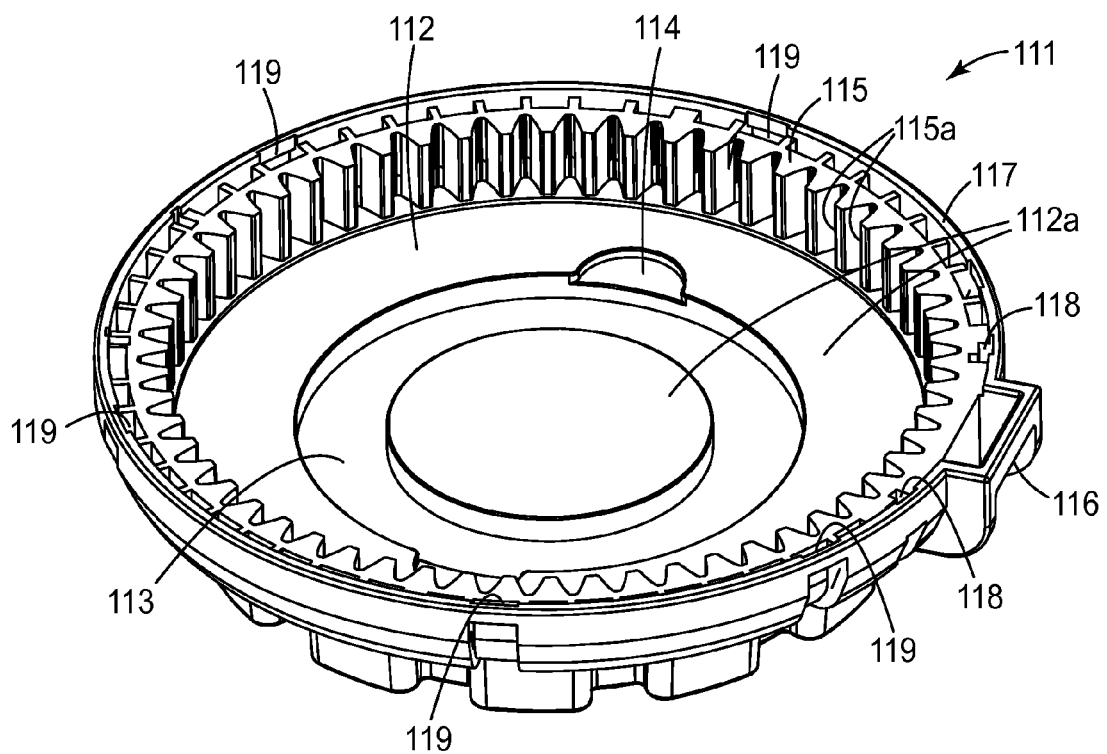
FIG. 2 is an isometric view of a base portion of the housing of the polishing apparatus of FIG. 1A.
Figure 3:
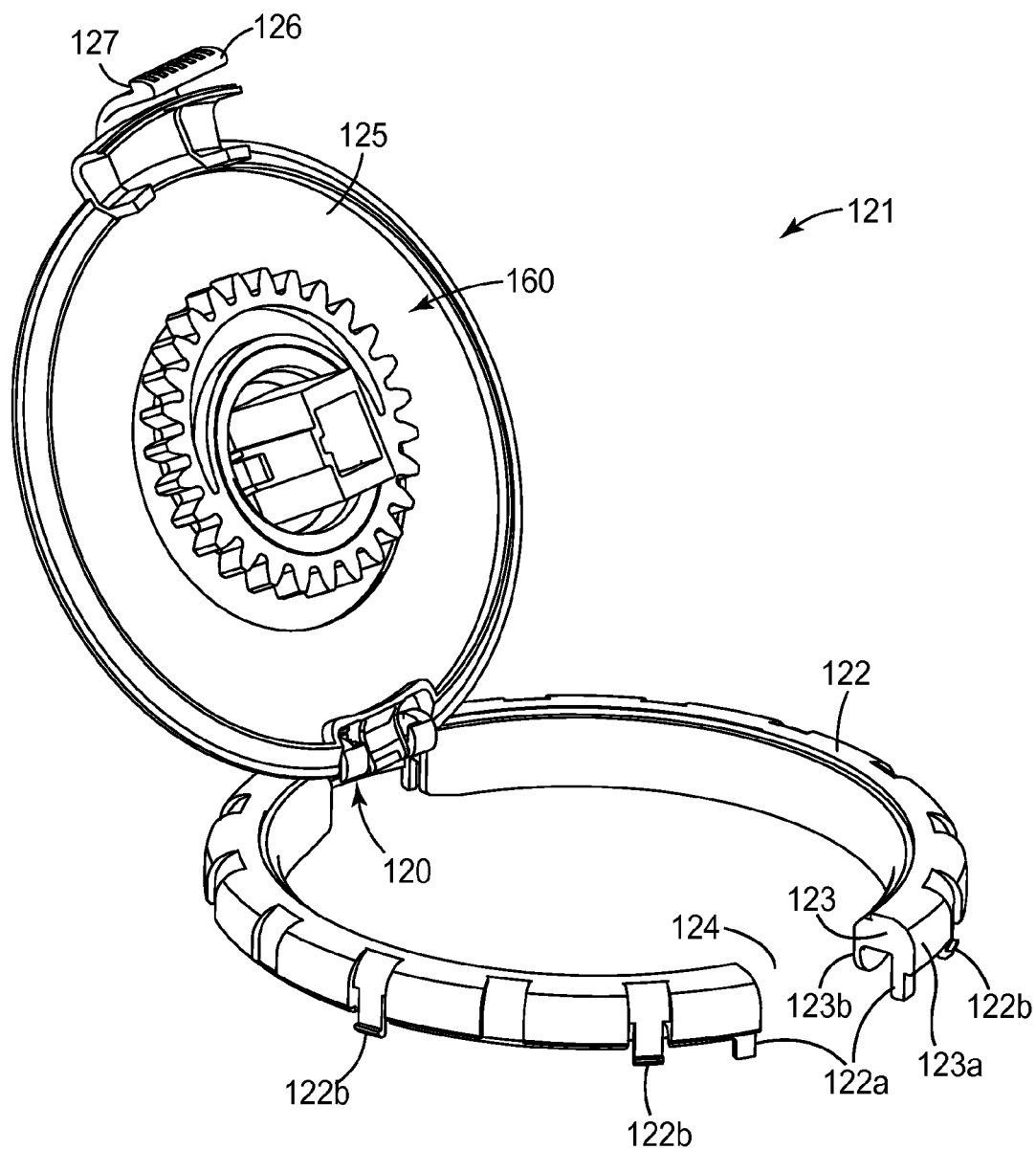
FIG. 3 is an isometric view of an optional cover portion of the housing of the polishing apparatus of FIG. 1A.

Base portion 111 supports a piece of polishing media 140 on a polishing platform 112. FIG. 2 shows base portion 111 without the cover portion attached. The polishing platform 112 includes a ring gear 115 extending from surface and adjacent to the exterior edge of the polishing platform. Ring gear 115 has a plurality of interior teeth 115a disposed along an interior circumferential edge of the ring gear and a rim 117 configured to engage with the attachment ring 122 of the cover portion 121 of the polishing apparatus housing 110. The attachment ring can have a generally C-shaped cross-sectional profile 123 (FIGS. 1A, 1C and 3). The outside edge of the C-shaped profile 123a rests on and/or engages with the rim 117 of base portion 111, while the inside portion of the C-shaped profile 123b of the attachment ring extends over the interior teeth 115a of the ring gear 115, beyond the internal circumference of the ring gear to ensure that proper positioning of the polishing puck 160 when the polishing apparatus is used to finish an optical fiber connector prior to the connector being put into service. In an exemplary aspect shown in FIG. 1A, the inside portion of the C-shaped profile 123b can be slightly longer than the outside portion of the C-shaped profile 123a as shown in FIG. 1C.

The rim 117 can include one or more guide holes 118 that are configured to engage alignment pegs 122a on attachment ring 122 of cover portion 121 (FIG. 3) to aid in positioning cover portion onto the base portion 111. Additionally, rim 117 can include a plurality of cover catches 119 spaced apart around the circumference of the rim that are configured to mate with a plurality of latch hooks 122b formed on the attachment ring 122 of the cover portion 121 to secure the cover portion to the base portion 111.

Base portion 111 can further include a depression, such as an annular channel 113, within the polishing platform 112 to aid in the holding of the polishing media 140 (FIG. 1A) in the case of a ring shaped piece of polishing media. In an alternative embodiment, the depression can be circular if using a piece of round polishing media or rectangular when using a rectangular piece of polishing media. The polishing platform 112 can also include an inset 114 to aid in the placing and removal of the polishing media from the polishing platform. In an exemplary aspect, the depth of the depression is greater than the depth of the inset.

The polishing media 140 can comprise a conventional polishing media or material. Depending on the type of polish, the polishing media 140 includes an abrasive material of larger grit size (e.g., 5-10 µm grit size) or a polishing media of a relatively finer grit-sized material (e.g., 0.02-0.05 µm grit size). For example, in one aspect, a ring shaped piece of 3M 869XW lapping film which has a nominal 0.01 µm silicon oxide grit (available from 3M Company, St. Paul, Minn.) may be utilized by placing it in annular channel 113 in the base portion 111 of the polishing apparatus. The polishing media 140 can be used in conjunction with a dry polish or a wet polish (e.g. water or alcohol). After a polishing operation is completed, the polishing media 140 can be removed from the polishing apparatus and replaced with a new piece of polishing media for the next polishing operation.

In a preferred aspect, the polishing media 140 can be backed by one or more compliant pads 150. In the exemplary aspect shown in FIGS. 1B and FIG. 1C, a single annular compliant pad 150 is used. FIG. 1C is a partial sectional view of the polishing apparatus 100 showing compliant pad 150 disposed within the annular channel 113 in the base portion 111. Compliant pad 150 can have a thickness of about 3 mm and a hardness of about 60 Shore A to about 80 Shore A, preferably about 75 shore A. However, the thickness of the compliant pad may vary depending on the depth of the annular channel, desired final fiber protrusion as well as other system design criteria. In an exemplary aspect, the compliant pad can be made of rubber, for example, a silicone rubber material. In an alternative aspect, two compliant pads (not shown) can be utilized. In this instance, the physical properties of each pad can be altered to provide the desired polishing surface. For example, one of the compliant pads can be a relatively hard, thin pad (with a thickness of about 0.8 mm and a Shore A hardness of about 60 to about 80). The other compliant pad can be relatively soft, thick pad (with a thickness of about 3 mm and a Shore 00 hardness of about 30 to about 50). In an exemplary aspect, the compliant pad 150 can have an adhesive coated on one of its major surfaces to allow the compliant pad to be adhesively secured within annular channel 113. Polishing media 140 can be held temporarily to the surface of the compliant pad 150 by applying a small amount of water to the surface of the compliant pad and setting the polishing media on top. Alternatively, an adhesive backed polishing media can be used.

The depth of annular channel 113 is greater than or equal to the combined thickness of compliant pad(s) 150 and the polishing media 140 (i.e. the surface of the polishing platform 112 is either even with or slightly higher than the surface of the polishing media). This configuration allows the body of the polishing puck 160 (i.e. the polishing gear 161 and the connector mount 171) to ride on the surface 112a of polishing platform 112. Configuring the polishing apparatus in this way helps eliminate some of the craft sensitivity found in conventional field polishing processes where the entire polishing puck rides on the surface of the polishing media which in turn is disposed on a compliant pad. In these conventional polishing processes, the craftsman can over polish the connector by pressing the polishing puck too hard against the surface of the polishing media or even cause an angled polish if they apply to much pressure to one side of the polishing puck.

The ring shaped configuration of the polishing media 140 and compliant pad 150 disposed concentrically with the polishing platform 112 enables greater control of the force on the tip 52 of the optical fiber secured in optical fiber connector 10. In an exemplary aspect, the appropriate contact force on the fiber tip being polished can be controlled to be from about 100 grams force to about 150 grams force, preferably about 130 grams force, depending on the length of the protruding fiber and the abrasive media. The combination of contact force, compliance of the polishing surface and shape of the ferrule tip cooperate to help provide a desired shape on the polished fiber surface.

The cover portion 121 of polishing apparatus 100 may further include a conventional latch 126 that can be used to secure the lid 125 in the closed position by engaging with catch 116 on the base portion of the polishing apparatus housing.

A conventional hinge 120 can be utilized to allow the lid 125 to be repeatedly opened and closed over multiple operations. As shown in FIGS. 1A and 3, lid 125 can be rotationally attached to attachment ring 122 by a hinge 120 comprising hinge pins disposed on one of the lid 125 and the attachment ring 122 and hinge pin receptacles located on the other of the attachment ring and the base. In the embodiment shown in FIG. 1B, the hinge pins 120a are disposed on lid 125 and hinge pin receptacles 120b are located on attachment ring 122. Of course any style of hinge structure that can rotatably attach lid 125 to attachment ring 122 is contemplated and should be considered within the scope of the current invention, including but not limited to a barrel hinge structure, a butt hinge structure, a friction hinge structure, etc. In an alternative aspect a snap-fit lid may be used.

Attachment ring 122 can further include a gap or broken section 124 to facilitate placement of the polishing puck 160 in the polishing apparatus. The gap allows the polishing gear 161 of the polishing puck 160 to engage with the interior teeth 115a of the base portion 111 while being easily inserted below the inside portion of the C-shaped profile 123b of attachment ring 122 as shown in FIG. 1A.

The polishing apparatus housing 110 including the base portion 111 and the cover portion can be constructed from a rigid material, such as a metal or molding plastic. Molding plastics can include glass or mineral filled polymer resins, engineering resins or rigid thermoplastic resins. Exemplary molding plastics can include polycarbonate, polyoxymethylene such as is available as Delrin® 100 NC010 from DuPont (Wilmington, Del.), poly(acrylonitrile/butadiene styrene) and blends or copolymers thereof. An exemplary blend of ABS and PC is available from Ngai Hing Engineering Plastic Materials, Ltd. (D0530, China). While the base portion 111 and the cover portion 121 are shown as separate components, in an alternative aspect, the attachment ring of the cover portion may be integrally formed with the base portion. In a preferred aspect, the polishing apparatus 100 is lightweight (e.g., less than 1 lbs., more preferably less than 0.5 lbs.).

Figure 4B:
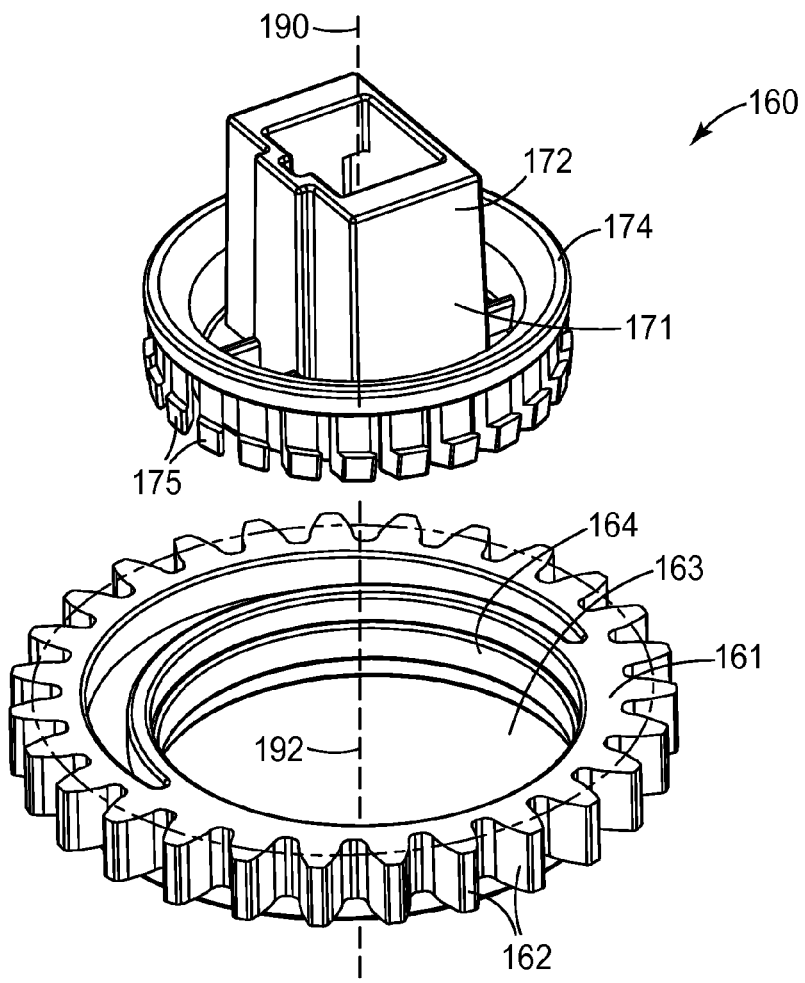
Figure 6A:
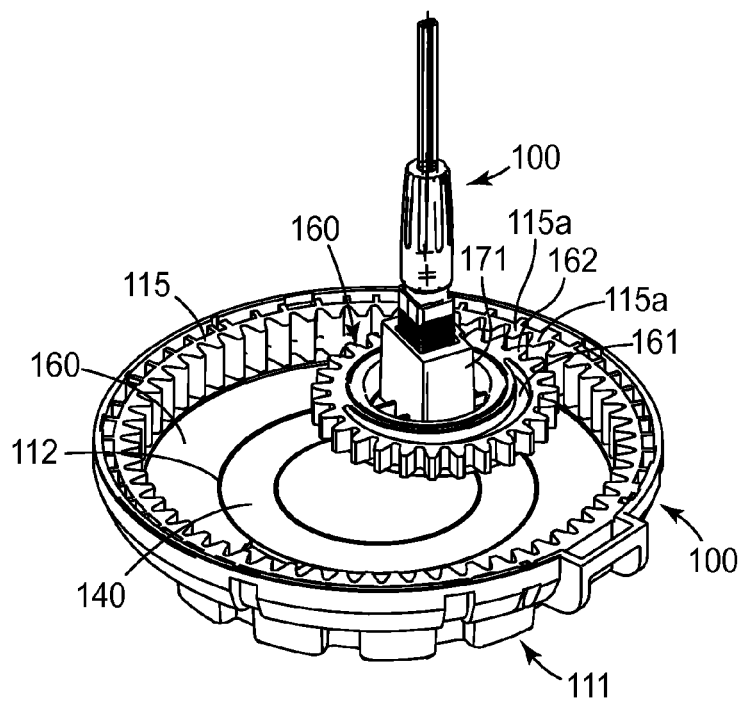
FIGS. 6A-6B are two views showing the polishing an optical fiber connector with the polishing apparatus of FIG. 1A.
Figure 6B:
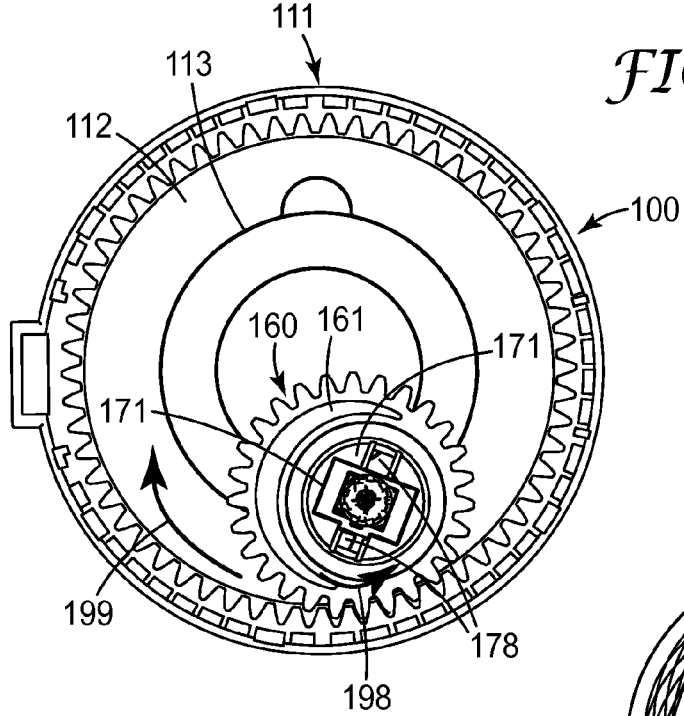

The polishing apparatus can further include a polishing puck 160 comprising a polishing gear 161 and a connector mount 171. The polishing gear has a plurality of exterior teeth 162 protruding from the circumferential edge of the polishing gear 161 as shown in FIG. 4B. The exterior teeth can be configured to engage with the interior teeth 115a of the ring gear 115 in the base portion 111 of the polishing apparatus housing 110 as shown in FIGS. 1A and 6A-6B. The polishing gear 161 has a central opening 163 passing therethrough to allow insertion of the connector mount 171 into the polishing gear. In an exemplary aspect, the central opening can be disposes off center from the center point of the polishing gear so that the connector mount can be positioned asymmetrically within the polishing gear. For example, the central axis 190 of connector mount 171 can be displaced from the center point 192 of the polishing gear 161 by about 1 mm to about 10 mm, preferably by about 2 mm to about 5 mm.

Polishing gear 161 can further include a center rib 164 running circumferentially around the interior of central opening 163 about mid-way between the top and the bottom of polishing gear 161. The center rib 164 engages with connector mount 171 to allow the polishing gear to rotate around the connector mount as the polishing gear is moved around the inside of the ring gear 115 of the base portion 111 of the polishing apparatus 100.

The connector mount includes connector holding structure 172 centrally disposed on the connector mount 171 to receive a conventional optical fiber connector in the connector, a circumferential flange 174 disposed around the edge of the connector mount and a plurality of hook-shaped protrusions 175 extending from the flange such that the center rib 164 of the polishing gear 161 will be disposed between the flange and the hook-shaped protrusions on the connector mount such that the connector mount can freely rotate within the polishing gear.

The connector mount 171 is configured to receive a conventional optical fiber connector in the connector holding structure 172. For example, a conventional connector can include a remote grip optical fiber connector 10 (see e.g. FIG. 6). Such an optical fiber connector 10 is described in detail in a PCT Patent Application, having attorney docket no. 67944WO002, entitled "Optical Fiber Connector" and filed on the same day herewith, incorporated by reference herein in its entirety. This exemplary connector 10 includes a outer housing 12 and a connector ferrule 14. When the optical fiber connector 10 is mounted in connector mount 171, the mount is configured to bring the end face 14a of the connector ferrule 14 (see e.g., FIGS. 5B and 7) and protruding fiber tip 52 of optical fiber cable 50 into proximity of the polishing media 140 disposed on the polishing platform 112 of the base portion 111 of polishing apparatus 110. The connector mount 171 also secures optical fiber connector 10 in place to reduce potential movement caused by unintentional forces placed on the fiber cable or connector components during polishing.

Figure 4C:
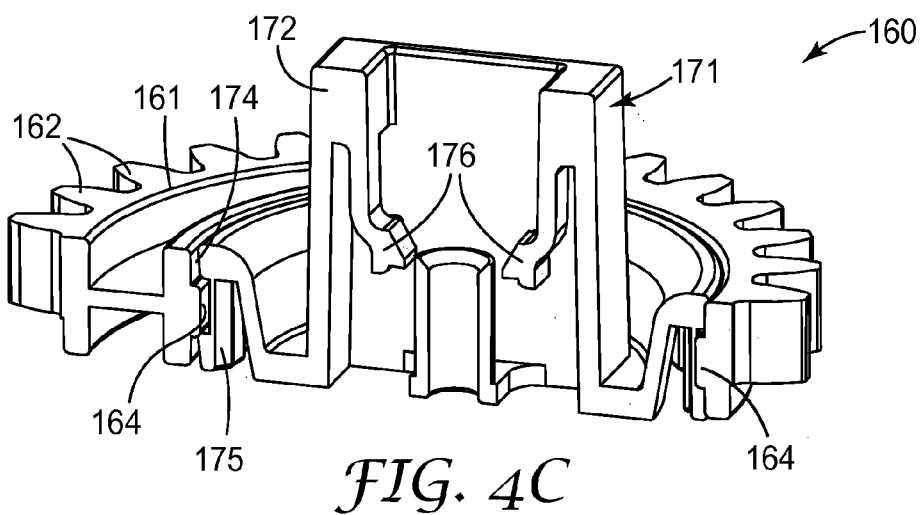

The connector mount 171 is configured to releasably hold and secure optical fiber connector 10 and to provide a snug fit to hold connector, e.g., by a snap fit. The connector holding structure 172 of the connector mount, shown in FIG. 4C, can include one or more latching structures 176 configured to engage with the outer housing 12 and a sleeve structure 177 to hold and stabilize the connector ferrule 14 of optical fiber connector 10. Preferably, connector 10 can be held by the connector mount 171 at a predetermined angle. For example, connector mount 171 can hold optical fiber connector 10 for a flat polish (0°), where the polishing media is perpendicular to the axial direction of the fiber, or, alternatively, an angled polish that is at a small angle (about 2° to about 12°) from perpendicular, to yield an angle-polished connector.

Figure 5A:
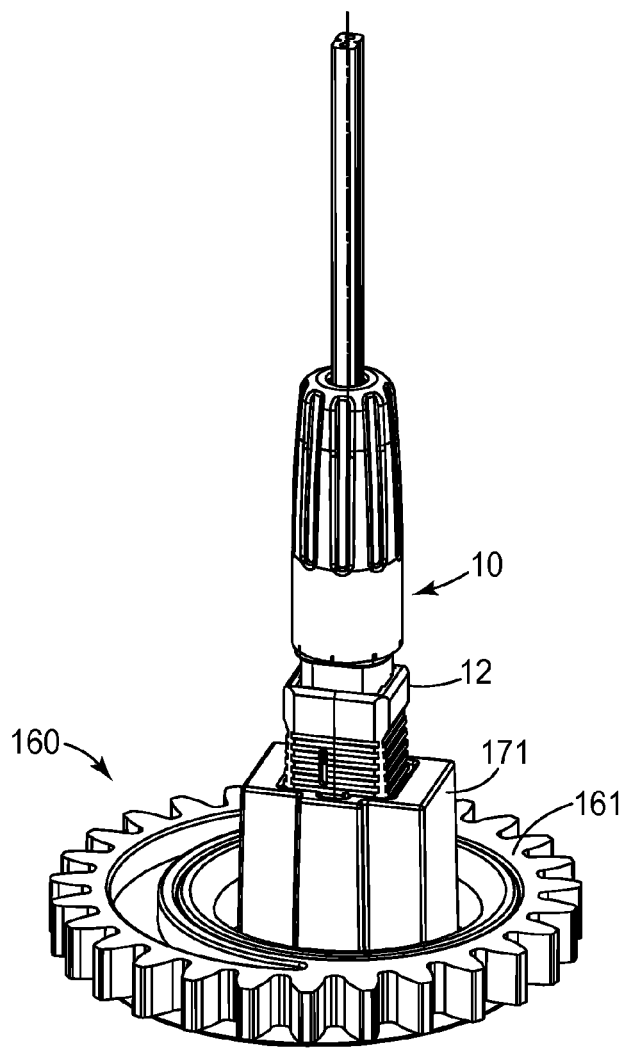
FIGS. 5A-5B are two views showing an optical fiber connector installed in the polishing puck of FIG. 4A.
Figure 5B:
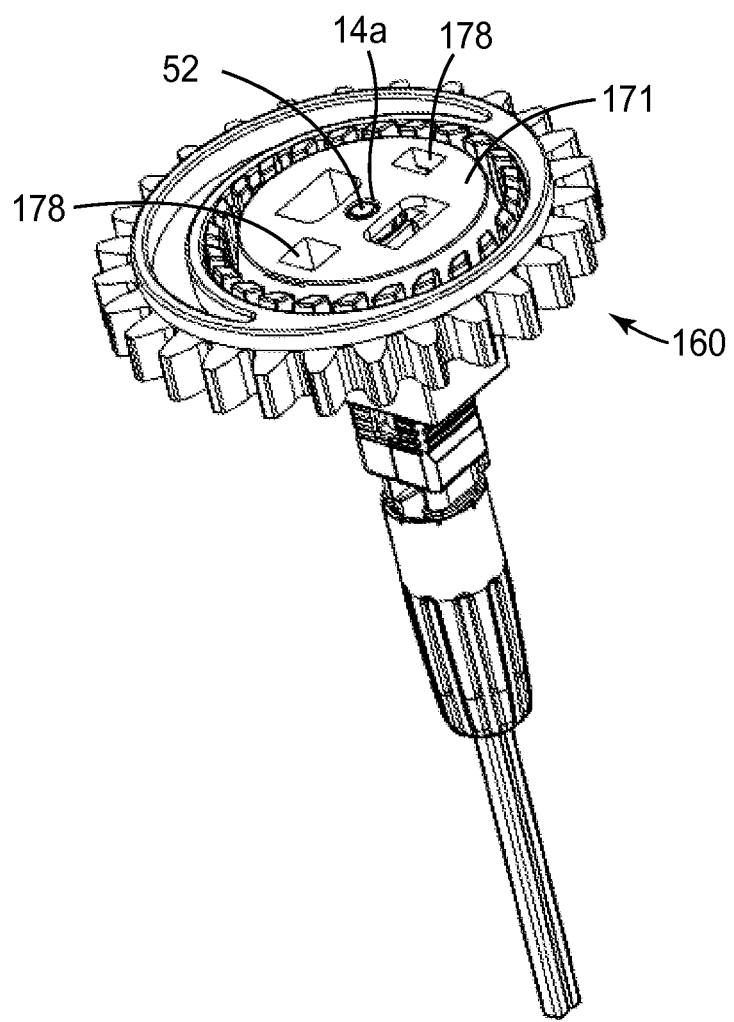

FIGS. 5A and 5B show two views of an optical fiber connector disposed in polishing puck 160. Specifically, FIG. 5B shows the bottom side of the polishing puck 160 showing the position of the end face 14a of the ferrule with the tip 52 of the optical fiber extending from the end face of the ferrule. When the polishing puck 160 is placed in the polishing apparatus, the tip 52 of the fiber is positioned against the polishing media 140 such that fiber tip experiences a contact force of from about 100 grams force to about 150 grams force against the polishing media, preferably about 130 grams.

The polishing puck 160 can be stored in the cover portion of the polishing apparatus when not in use. FIG. 3 shows the polishing puck 160 stowed for storage on the inside surface of lid 125 of cover portion 121 of the polishing apparatus. Lid 125 can include a pair of arms 128 protruding from the inside surface of the lid. The arms are configured to hold the polishing puck 160 in storage position by engaging with one or more openings 178 (best seen in FIGS. 5B and 6B) within connector mount 171 of the polishing puck.

FIGS. 6A and 6B show the base portion 111 of polishing apparatus without a cover portion attached. If there is concern about lifting the polishing puck during the polishing process an optional cover portion 121 (FIGS. 1A and 3) can be attached to the base portion as previously described. The inside portion 123b of the C-shaped profile 123 of the attachment ring 122 forms a lip that extends over the interior teeth of the ring gear to ensure that proper positioning of the polishing puck 160 when the polishing apparatus is being used to finish an optical fiber connector prior to being put into service. The lip extends beyond the interior circumferential edge of the ring gear to guide and retain the polishing gear while polishing the tip of the optical fiber.

In addition, FIGS. 6A-6B show how an optical fiber connector can be polished using the exemplary polishing apparatus 100 of the current disclosure. An exemplary method of the present invention provides a repeatable process that can lead to repeatable field polishing results. In particular, the following method can be employed to effectuate one or more field polished optical fiber connectors in a straightforward manner. In an exemplary aspect, the overall process includes stripping and cleaving the fiber cable, setting the fiber protrusion (distance between the fiber tip and the ferrule end face), and polishing the fiber tip. After polishing, the fiber tip can be cleaned.

In more detail, a strain relief boot (see FIG. 7, boot 18) can be threaded onto optical fiber cable 50. The optical fiber cable can be prepared by removing a terminal portion (e.g., ~60 mm) of the cable jacket 54. The fiber can then be stripped of its buffer coating using a conventional fiber cable stripper such that the buffer coating extends about 28 mm beyond the cable jacket. The exposed glass tip portion can be cleaned using an alcohol (or other conventional cleaner) wipe.

The fiber can be positioned into a field cleaver, such as the cleaver described in PCT Publication No. WO 2009/051918, incorporated by reference herein in its entirety, which describes a field cleaving operation, using e.g., a diamond coated wire. Of course other conventional cleavers can be used that are able to produce a fiber tip having a cleave angle of between 0° to about 3.5° from perpendicular.

The cleaved fiber is then guided into and through optical fiber connector 10 until the tip 52 of the optical fiber exits the end face 14a of ferrule 14 and bottoms out in the divot or recess formed in the end cap of the connector. This process sets the proper protrusion distance that the top of the optical fiber extends from the end face of the ferrule at the point when a slight bow in the fiber assures that the tip of the fiber has contacted the bottom of the recess in the end cap. A sufficient protrusion can be from about 15 μm to about 35 μm, with a preferable protrusion of about 25 μm. With the remote grip optical fiber connector 10, the gripping element is then actuated using an actuator cap 15 to secure the fiber position within connector. Boot 18 can then be screwed onto a portion of the backbone causing the actuation of the fiber jacket clamping portion of the backbone clamping the connector to the optical fiber connector 10 to the cable jacket 54 of optical fiber cable 50.

Optical fiber connector 10 is thus ready for polishing and can be inserted in the connector mount 171 of the polishing puck 160. The polishing media 140 (e.g., a die cut ring of 863XW lapping film from 3M Company, a 869XW lapping film from 3M Company, or other lapping film) can be placed onto the exposed surface of the compliant pad within annular channel 113 and wetted with DI water or other conventional polishing fluid. In another aspect, a dry polishing process may be used.

Polishing puck 160 is placed into the polishing apparatus such that a portion of the exterior teeth 162 on the polishing gear 161 of the polishing puck engage with a portion of the interior teeth 115a of the ring gear 115 which is a part of the base portion 111. The polishing gear is moved in a polishing direction around the interior circumference of the ring gear, for example in a direction indicated by arrow 199 shown in FIG. 6B. Because the connector mount is rotationally mounted in to the polishing gear, the connector mount will rotate in a direction opposite the polishing direction as indicated by arrow 198 allowing the craftsman's hand to plantain a constant orientation with respect to the connector mount. If the connector mount were not free to rotate within the polishing gear, the constant changing of the craftsman's hand relative to the polishing puck could result in unreliable results after polishing.

Figure 6C:
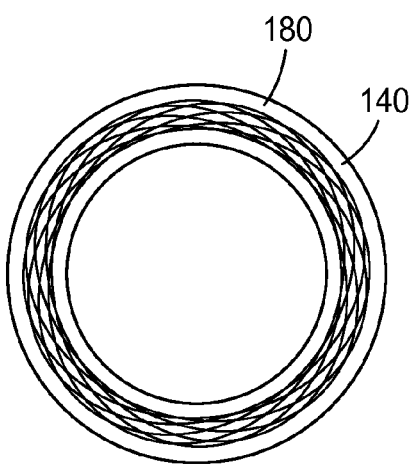
FIG. 6C is a schematic view of the pattern traced by the tip of the optical fiber being polished by the exemplary polishing apparatus.

The length of the polish process is determined by the number of revolutions that the polishing puck travels around the inner circumference of polishing apparatus 100. For example, 6 revolutions can be equivalent to about one meter of travel of the tip of the optical fiber along the surface of the polishing media and eight revolutions can be to about one and a third meters of travel. Because the tip of the optical fiber travels multiple revolutions around the polishing apparatus, it is desirable that the traces of each revolution do not overlap or retrace the pattern from a previous revolution. FIG. 6C shows a schematic diagram of the roulette pattern 180 traced on the polishing media 140 by the tip of the optical fiber during a typical polishing process. Specifically, the roulette pattern forms a hypocycloid as a result of the polishing gear of the polishing puck rolling along the inner circumference of the ring gear. In order to form this hypocycloid pattern, the ratio between the number of interior teeth on the ring gear and the number of exterior teeth on the polishing gear is selected to have a non-integer value.

This polishing procedure can produce a polished fiber tip having a protrusion of about 15 μm (±10 μm) and a convex shape with an apex offset of ≤50 μm, preferably ≤15 μm. After the polishing procedure, the fiber tip may be cleaned with an alcohol wipe.

For the next connector polishing operation, the polishing media 140 can be replaced with a new film and the polishing apparatus is ready to polish the next connector once it has been mounted in the polishing puck.

In an alternative aspect, more than one polishing media 140 can be utilized to polish a connector. For example, for hot melt connector, a first polishing media having a relatively coarse grit can be utilized to remove excess adhesive and reduce the length of the protruding fiber. After the procedure described above is completed, the polishing puck is removed from the polishing apparatus and the polishing media replaced by a piece of finer grit polishing media. The polishing puck is reintroduced into the polishing apparatus and rotated around the interior circumference of the polishing apparatus the desired number of additional revolutions to achieve the final end face polish of the connector.

Figure 8A:
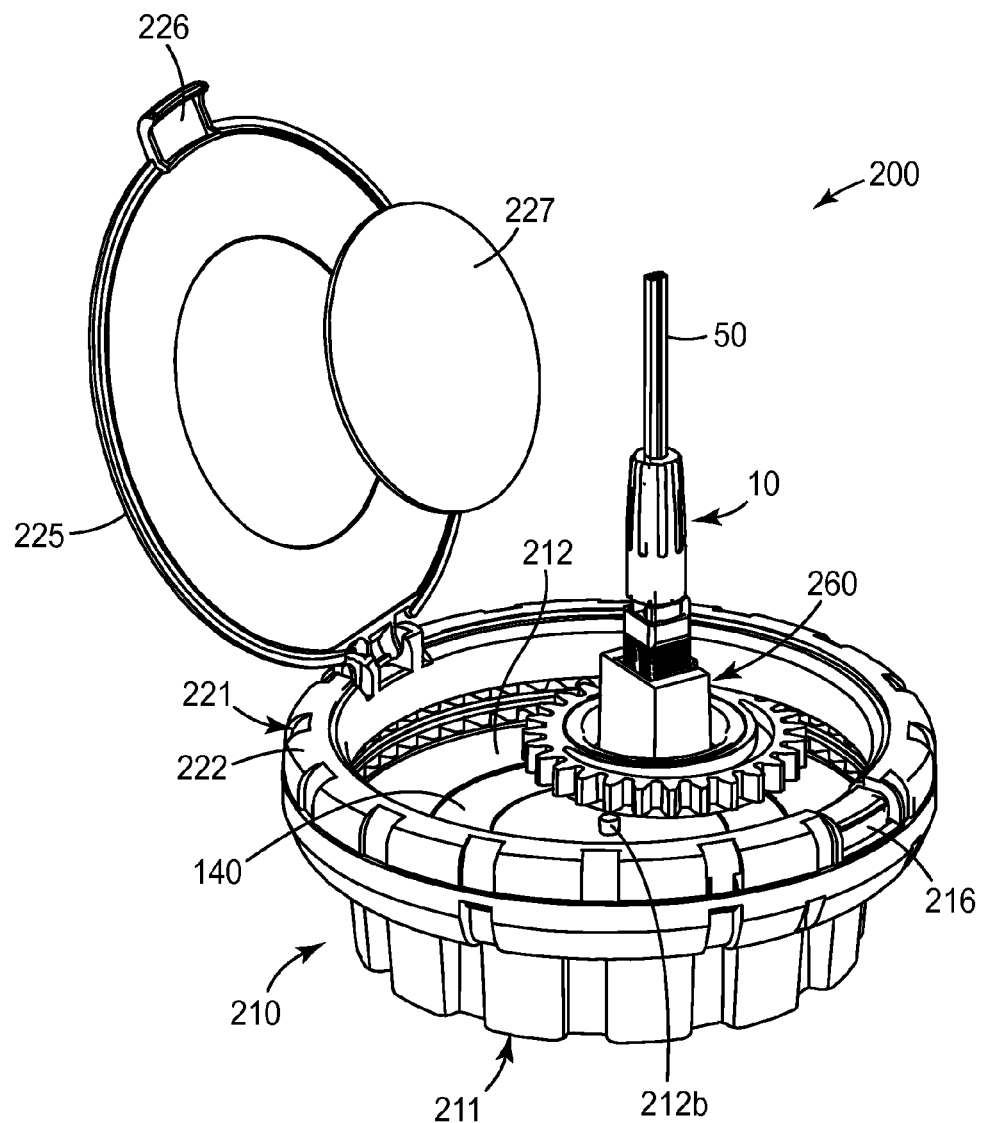
FIGS. 8A-8B are two views of an alternative exemplary polishing apparatus according to an aspect of the present invention.
Figure 8B:
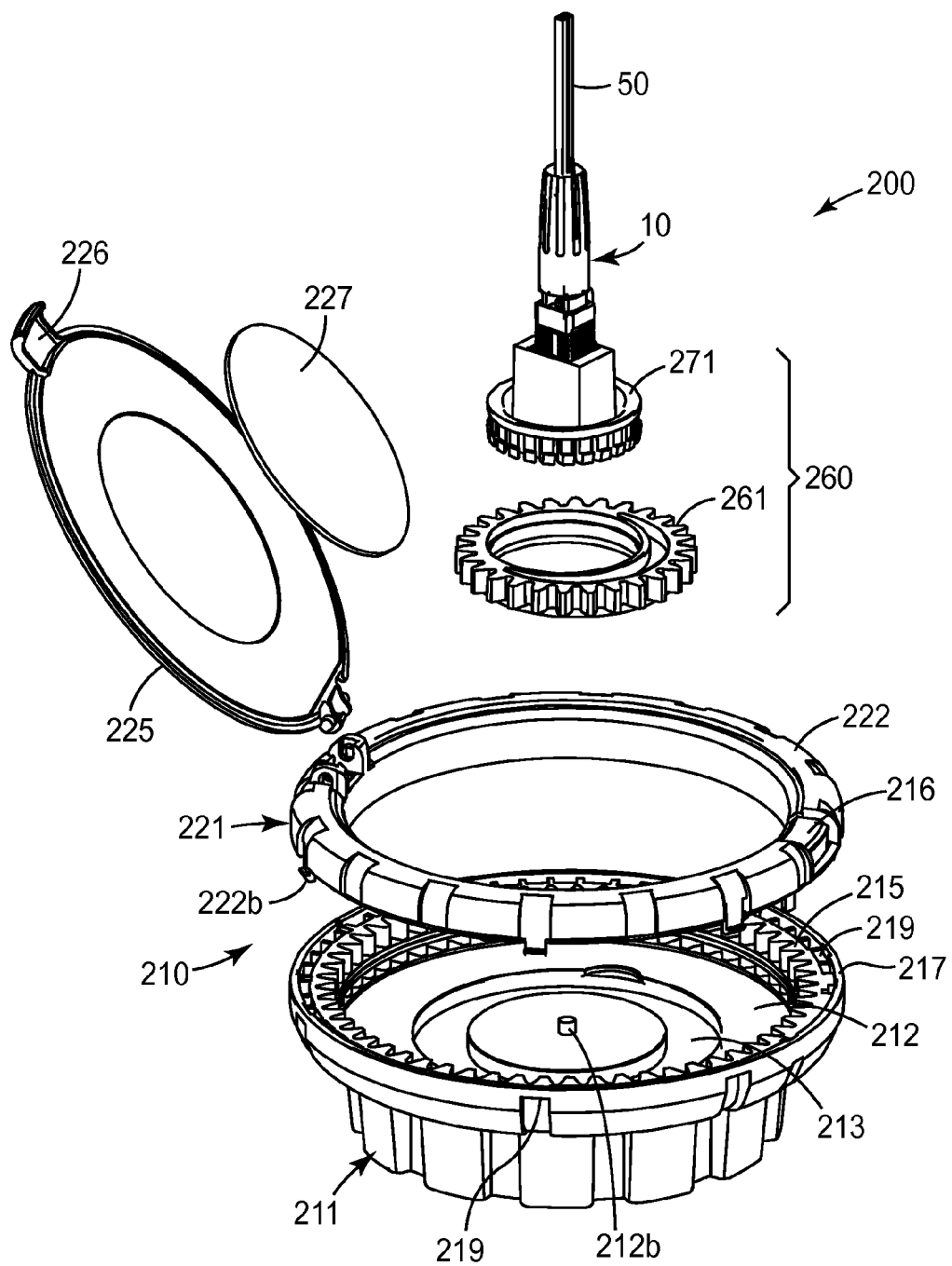

FIGS. 8A and 8B show an assembled open view and an exploded view of an alternative exemplary embodiment of polishing apparatus 100, which is similar in many respects to polishing apparatus 100 shown in FIGS. 1A and 1B. Polishing apparatus 200 includes a polishing apparatus housing 210 having a base portion 211 and an optional cover portion 221 and a polishing puck 260. The cover portion can have an attachment ring 222 to secure the cover portion to the base portion 211 and a lid 225. The lid can be opened, as shown in FIG. 8A, to provide access to the interior of the polishing apparatus when in use or can be closed for storage.

Base portion 211 supports a piece of polishing media 140 on a polishing platform 212. The polishing platform 212 includes a ring gear 215 extending from surface and adjacent to the exterior edge of the polishing platform as described previously. Ring gear 215 has a plurality of interior teeth disposed along an interior circumferential edge of the ring gear and a rim 217 configured to engage with the attachment ring 222 of the cover portion 221. The attachment ring can extend over the interior teeth of the ring gear, beyond the internal circumference of the ring gear to ensure that proper positioning of the polishing puck 260 when the polishing apparatus is used to finish an optical fiber connector prior to the connector being put into service.

Base portion 211 can include a depression, such as an annular channel 213, within the polishing platform 212 to aid in the holding of the polishing media 140. In a preferred aspect, the polishing media 140 can be backed by one or more compliant pads (not shown in FIGS. 8A and 8B).

The polishing puck comprises a polishing gear 261 and a connector mount 271 rotatably mounted in the polishing gear wherein the connector mount is configured to receive a conventional optical fiber connector to be polished. The terminal end of the optical fiber mounted in the optical connector traces a roulette pattern on the polishing media upon rotational engagement of the polishing puck within the ring gear.

Figure 9:
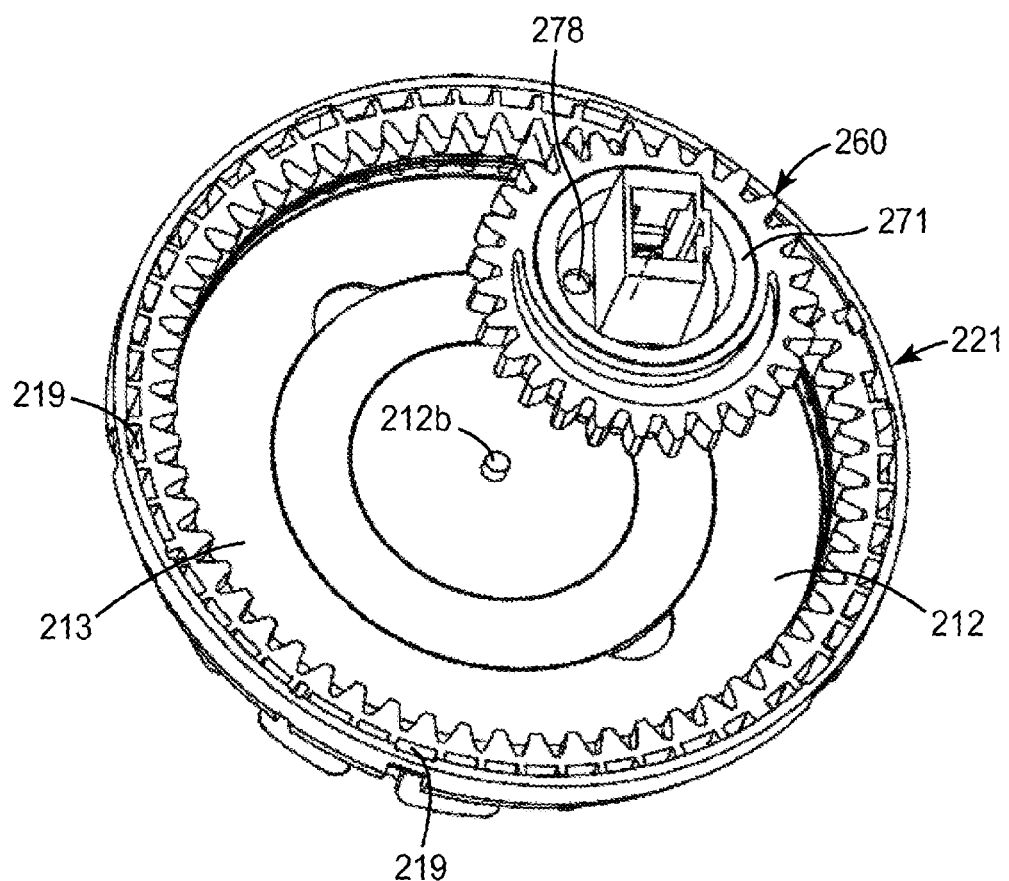
FIG. 9 is an isometric view of a base portion and the polishing puck of the housing of the polishing apparatus of FIG. 8A.

Base portion 211 can further include a storage peg 212b extending from its surface near the center of the polishing platform, such that it will not hinder the movement of polishing buck as it is moved within the polishing apparatus. The storage peg 212b mates with openings 278 (FIG. 9) within connector mount 271 of the polishing puck 260 to help secure the polishing puck for storage when polishing apparatus 200 is not in use. The polishing puck is held in its secured position by the lid 225 of the polishing apparatus is secured in a closed position.

Rim 217 on base portion 211 can include a plurality of cover catches 219 spaced apart around the circumference of the rim that are configured to mate with a plurality of latch hooks 222b formed on the attachment ring 222 of the cover portion 221 to secure the cover portion to the base portion.

The cover portion 221 of polishing apparatus 100 may further include a conventional latch 226 that can be used to secure the lid 225 in the closed position by engaging with catch 216 on the attachment ring of the polishing apparatus housing. A conventional hinge can be utilized to allow the lid 225 to be rotatably opened and closed over multiple operations.

Cover portion 221 can further include a piece of compliant foam 227 adhesively attached to lid 225 to securely hold the polishing puck against the polishing platform when the lid is closed for storage, thus preventing the polishing puck from rattling around within the polishing apparatus when the polishing apparatus is not in use. The compliant foam can be either an open cell foam or a closed cell foam. In an exemplary aspect, the compliant foam can be one of a neoprene foam, a polyurethane foam or a nitrile-butadiene rubber/polyvinyl chloride foam.

The exemplary embodiments described above can simplify the field polishing process, while controlling several sources of variability that have in the past led to a skill-level dominated practice. For example, the common "air polishing" practice of beginning a field polish while holding an abrasive polishing material in air (without any controlled backing force being applied) can be eliminated. The polishing apparatus can be a simple hand tool, without the need for a motor or power source. For certain connectors, such as described above, only a single polishing step would be needed.

While the invention above has been described mainly with respect to a single fiber remote grip connector using a mechanical fiber grip, the apparatus and method described herein may be used with a multi-fiber connector (e.g. a multi-fiber MT-type connector), and/or a remote adhesive grip, as would be apparent to one of ordinary skill in the art given the present description.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A polishing apparatus for polishing an optical fiber connector, comprising:
    a base portion to support a polishing media; and
    a polishing puck having a connector mount, to receive and hold the optical fiber connector secured to a terminal end of an optical fiber, and a polishing gear configured to engage with a ring gear disposed in the base portion, wherein, when mounted, a fiber tip of optical fiber traces a roulette pattern on the polishing media upon rotational engagement of the polishing gear within the ring gear.

2. The apparatus of claim 1, wherein the ring gear has a plurality of interior teeth disposed along an interior circumferential edge of the ring gear; and wherein the polishing gear has a plurality of exterior teeth protruding from the circumferential edge of the polishing gear that engage with the interior teeth of the ring gear of the polishing apparatus housing.

3. The apparatus of claim 1, further comprising one or more compliant backing pads are disposed between the polishing media and the base portion of the polishing apparatus housing.

4. The apparatus of claim 3, wherein the one or more compliant pads comprise a first compliant backing pad disposed between the polishing media and a second compliant backing pad.

5. The apparatus of claim 1, wherein the fiber tip experiences a contact force of from about 100 grams force to about 150 grams force when the optical fiber connector is disposed in the connector mount and the polishing puck is placed in the polishing apparatus.

6. The apparatus of claim 1, wherein the connector is held in the mount at a predetermined angle, the predetermined angle providing for one of a flat polish that is perpendicular to the longitudinal direction of the fiber and an angled polish.

7. The apparatus of claim 6, wherein the angled polish comprises an angle from perpendicular from about 2° to about 12°.

8. The apparatus of claim 1, wherein the connector mount is asymmetrically mounted in the polishing gear.

9. The apparatus of claim 1, wherein the connector mount is rotatably mounted in the polishing gear.

10. The apparatus of claim 2, wherein a ratio of interior gear of the base portion of the housing to the exterior teeth on the polishing gear has a non-integer value.

11. The apparatus of claim 1, wherein the roulette is a hypocycloid.

12. The apparatus of claim 1, where in the optical fiber connector is a remote grip optical fiber connector.

13. The apparatus of claim 1, where in the optical fiber connector is a multi-fiber optical fiber connector.

14. The apparatus of claim 1, further comprising a cover portion attached to the base portion.

15. The apparatus of claim 14, wherein the cover portion can comprise an attachment ring and a lid.

16. The polishing apparatus of claim 15, wherein the attachment ring forms a lip that extends beyond an interior circumferential edge of the ring gear to guide and retain the polishing gear while polishing the tip of the optical fiber.

17. A method of polishing an optical fiber connector comprising:
    providing an optical fiber having a stripped terminal end;
    cleaving an exposed end of the optical fiber to produce a fiber tip;
    inserting the fiber through a connector body and a ferrule such that the fiber tip protrudes from the end of the ferrule;
    securing the optical fiber in the optical fiber connector;
    placing the optical fiber connector in a connector of a polishing apparatus, the polishing apparatus including a polishing apparatus housing including a base portion that supports a polishing media and includes an ring gear having a plurality of interior teeth disposed along the interior circumferential edge of the ring gear and a polishing puck comprising the connector mount disposed within a polishing gear, wherein the polishing gear has a plurality of exterior teeth protruding from the circumferential edge of the polishing gear that engage with the interior teeth of the ring gear of the polishing apparatus housing; and moving the polishing gear in a circular path within the ring gear such that the fiber tip traces a roulette on the polishing media.

18. The apparatus of claim 17, wherein the roulette is a hypocycloid.

\* \* \* \* \*